United States Patent [19]
Krzyzosiak, Jr.

[11] 4,368,002
[45] Jan. 11, 1983

[54] CAR CARRIER
[75] Inventor: Andrew Krzyzosiak, Jr., Chambersburg, Pa.
[73] Assignee: Jerr-Dan Corporation, Greencastle, Pa.
[21] Appl. No.: 239,446
[22] Filed: Mar. 2, 1981
[51] Int. Cl.³ .................. B60P 3/008; B60P 1/014
[52] U.S. Cl. .................. 414/494; 254/415; 410/26; 414/559
[58] Field of Search .......... 410/26, 24, 27, 28, 410/29, 30, 12; 414/500, 538, 559, 494; 254/326, 335, 415

[56] References Cited
U.S. PATENT DOCUMENTS

| 2,168,463 | 8/1939 | Wunsch | 254/415 |
| 2,541,970 | 2/1951 | Pospisil | 254/415 |
| 2,576,187 | 11/1951 | McBride et al. | 414/538 |
| 2,581,298 | 1/1952 | Roe | 254/415 |
| 2,745,566 | 5/1956 | Bouffard | 414/494 |
| 2,765,938 | 10/1956 | Di Addezio | 414/538 |
| 2,963,186 | 12/1960 | Beck et al. | 414/494 |
| 3,034,674 | 5/1962 | Betoglio et al. | 414/494 |
| 3,370,726 | 2/1968 | Ijichi | 414/494 |
| 3,613,919 | 10/1971 | Creepo et al. | 414/494 |
| 3,871,540 | 3/1975 | Jenkins | 414/538 X |
| 4,239,275 | 12/1980 | Horneys et al. | 410/26 X |

Primary Examiner—Joseph F. Peters, Jr.
Assistant Examiner—M. J. Hill
Attorney, Agent, or Firm—Brady, O'Boyle & Gates

[57] ABSTRACT

A two car carrier truck employs an above-cab tilting platform for the support of one car in transit. A cable winch is located at the rear of this platform with a guide sheave for the cable at the front of the platform assuring a proper fleet angle for the cable being wound onto the winch drum even when the car is in a fully loaded position. Proper layering of the cable on the winch drum is assured and dangerous uneven piling up of the cable is eliminated. The overall length of the transport truck is reduced, driver vision is improved, and car loading time is reduced by placement of the winch closer to the operator's control panel at the rear of the truck. Oil leakage from the winch blowing back onto the truck windshield is eliminated. Proper layering of the cable on the winch drum is also assured for the tilting platform behind the truck cab when the winch is located at a medial portion of the platform a distance rearwardly from a guide sheave on the front thereof which assures a proper fleet angle for the cable relative to the winch drum.

8 Claims, 10 Drawing Figures

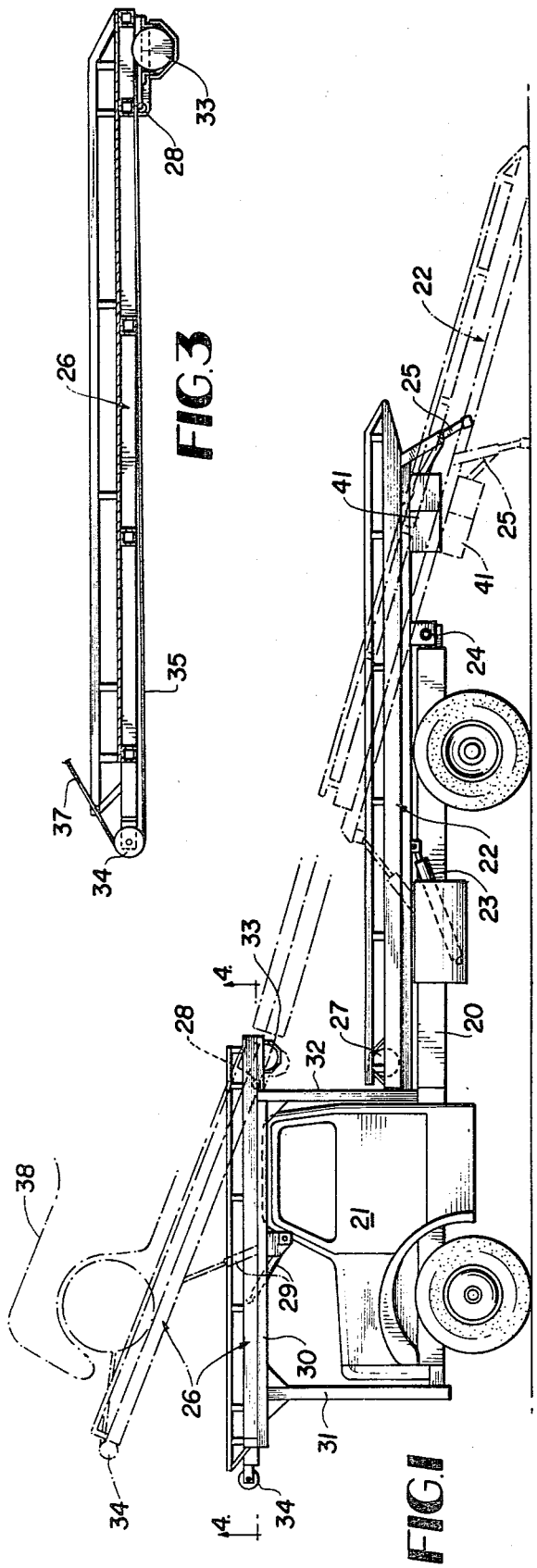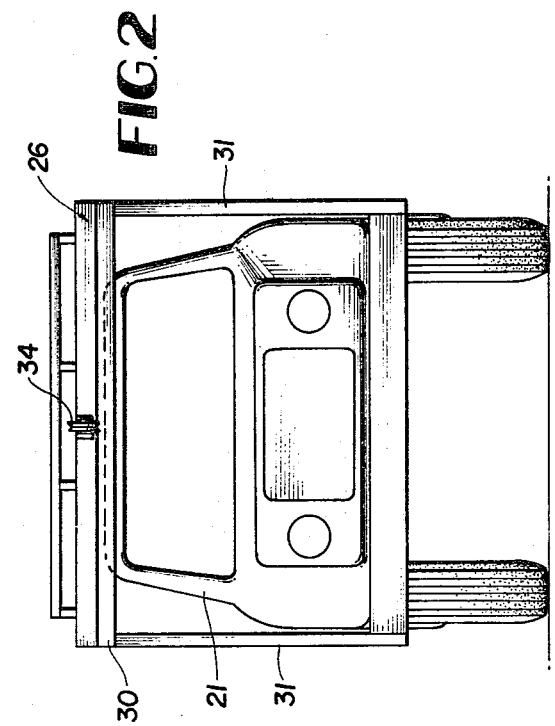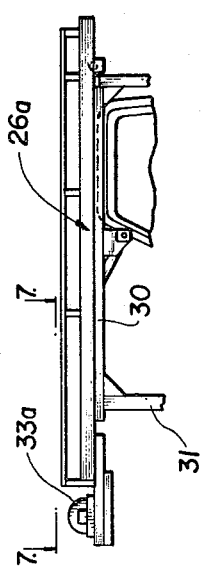

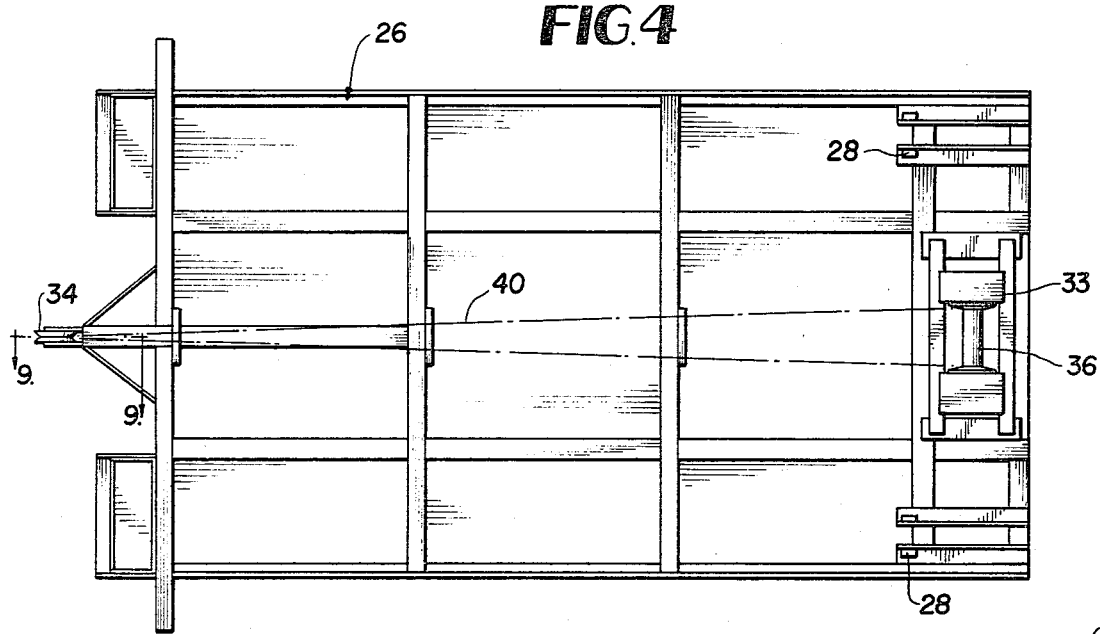
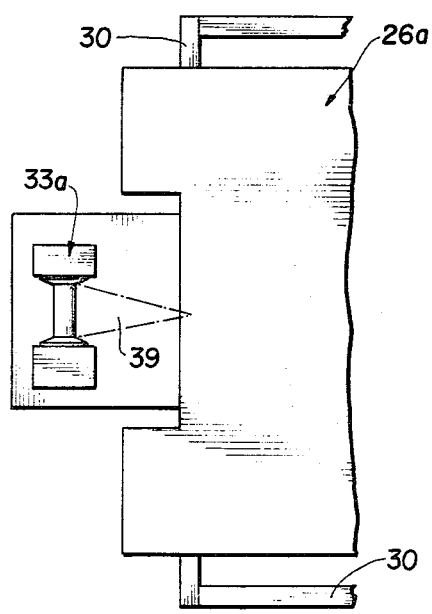
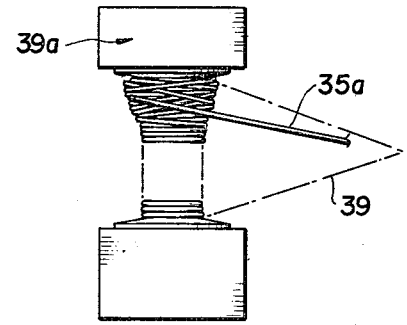
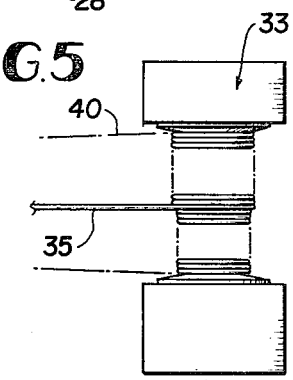
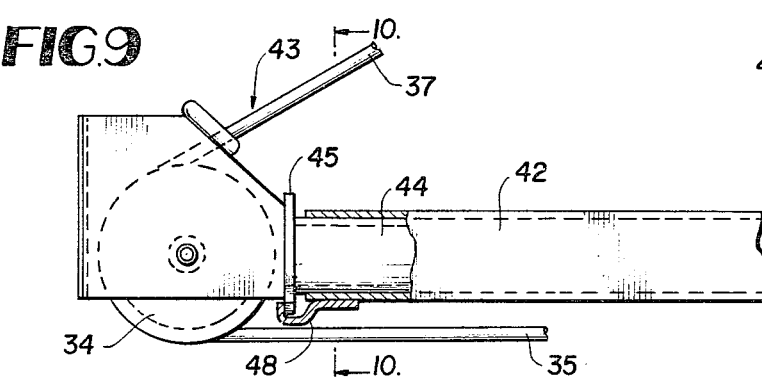
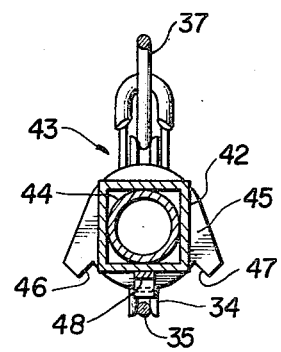

CAR CARRIER

BACKGROUND OF THE INVENTION

The invention relates to improvements in a known type of car carrier, namely, a two-car carrier having a rear tilting and sliding bed for one car and a forward above-cab tilting platform for a second car.

In the prior art, separate winches have been provided for the two beds or platforms of the carrier truck at the forward ends of the platforms. These separate winches are employed to draw automobiles up onto the carrier platforms and to lower them and also for lashing the vehicle down during transport.

The placement of the winch for the above-cab platform at the forward end of such platform causes some serious difficulties which the present invention seeks to completely eliminate by placing the winch at the rear of the above-cab platform and providing a cable guide sheave at its front.

The most serious difficulty with the prior art arrangement is that the cable fleet angle becomes too large and the cable lead distance too small as the car being loaded approaches its full up transport position on the above-cab platform. This results in dangerous pile-up of the cable on the winch drum, uneven layering of the cable and fraying. Additionally, the bulky winch mechanism when at the front of the platform somewhat interferes with the truck driver's view, increases the overall length of the truck, and sometimes produces soiling of the truck windshield due to oil leaking from the winch being blown back onto the windshield in transit. All of these drawbacks are eliminated by placing the winch at the rear end of the above-cab tilting platform immediately rearwardly of the truck cab.

An additional important benefit is derived from the relocation of the winch, namely, a reduction in car loading time, due to the fact that the winch is closer to the operator's control panel at the rear of the truck. Because of this, it is no longer necessary for the operator to walk to the front of the truck in order to initially release the cable end for connection with a vehicle being loaded.

In accordance with the invention, a constant fleet angle and lead length for the winch cable between the forward guide sheave and rear winch drum is maintained, regardless of the position of the vehicle being loaded, and smooth and proper layering of the cable onto the winch drum without fraying and dangerous uneven pile-up is assured at all times. These advantages are also obtained when the winch, in accordance with the invention, is located rearwardly of the guide sheave on any tiltable platform a distance which assures a proper fleet angle for the cable relative to the winch drum.

Other features and advantages of the invention will become apparent during the course of the following detailed description.

BRIEF DESCRIPTION OF THE DRAWINGS

FIG. 1 is a side elevation of a two car carrier truck in accordance with the present invention.

FIG. 2 is a front elevation thereof.

FIG. 3 is an enlarged side elevation of an above-cab tilting platform having a rear mounted winch according to the invention.

FIG. 4 is a bottom plan view of the above-cab platform and winch taken on line 4—4 of FIG. 1.

FIG. 5 is an enlarged partly schematic plan view of the rear mounted winch and a cable being spooled thereon at a proper fleet angle.

FIG. 6 is a fragmentary side elevation of an above-cab platform and forward mounted winch according to the prior art.

FIG. 7 is a fragmentary plan view taken on line 7—7 of FIG. 6 and indicating an improper fleet angle for the cable in the prior art.

FIG. 8 is a view similar to FIG. 5 depicting the piling-up of cable on the winch spool when an improper fleet angle exists.

FIG. 9 is an enlarged side elevation, partly in section, taken substantially along line 9—9 of FIG. 4 and showing a modified mounting for the forward cable sheave.

FIG. 10 is a cross-sectional view taken substantially on line 10—10 of FIG. 9.

DETAILED DESCRIPTION

Referring to the drawings in detail wherein like numerals designate like parts, a two car carrier truck comprises a main frame 20 carrying a conventional driver's cab 21 and being essentially conventional. A bed or platform 22 for the support of one automobile in transit is tiltable and longitudinally slidable relative to the frame 20 under influence of a tilting cylinder 23 and a sliding cylinder means which is concealed in the drawings. The tilting axis of the platform 22 is shown at 24 at the rear of the main frame 20. A stabilizing strut 25 for the platform 22 in the tilted roadway engaging position shown in phantom lines in FIG. 1 is provided in accordance with conventional practice. From this inclined position, the platform 22 can slide forwardly and upwardly to a position behind the cab 21 so as to form a continuous inclined ramp in concert with a forward above-cab platform 26 forming the main subject matter of this invention. All of the construction thus far described is conventional.

The rear platform 22 is provided at its forward end with a cable winch 27 which is utilized to pull one automobile up onto the rear platform and to lash the automobile down during transit, at which time both of the platforms 22 and 26 are in a level position as shown in full lines in FIG. 1. In such positions, one automobile is supported above the cab 21 on platform 26 and a second automobile is supported behind the cab on platform 22.

The forward above-cab platform 26 has a transverse tilt axis 28 near cab roof level and closely behind the cab 21. The platform 26 is raised and lowered by power cylinder means 29 fixed to a rigid support frame 30 having forward and rear posts 31 and 32. A cable winch 33 for the platform 26 is mounted on its rear end centrally and is underslung with respect to the platform so as to be directly behind the roof of the cab 21. At its forward end, the platform 26 carries a single guide sheave 34 for the cable 35 being wound and unwound from the winch spool 36. This cable can be wound and unwound from the top of the winch spool and trained around the forward sheave 34 from the lower side thereof and then rearwardly and upwardly from the sheave as at 37 for connection with the car 38 being winched up onto the platform 26.

With reference to FIGS. 1 and 3, it can be noted that the cable portion 37 above sheave 34 becomes extremely short as the car 38 approaches its fully loaded transport position on the platform 26. In the prior art illustrated by FIGS. 6 through 8 with the loading winch 33a mounted at the front of the above-cab platform 26a, the fleet angle 39, FIG. 7, for the cable becomes excessive and the cable 35a in the prior art cannot layer itself evenly on the cable drum or spool as indeed it can according to the invention when the winch 33 is on the rear of platform 26. The desirable cable layering on the winch drum without pile-up in accordance with the invention is shown in FIG. 5. The undesirable piling-up and uneven spooling in the prior art is depicted in FIG. 8.

The unchanging smaller and desirable cable fleet angle in accordance with the invention is indicated at 40 in FIGS. 4 and 5, in contrast to the excessive fleet angle 39. Furthermore, the cable lead distance between guide sheave 34 and winch spool 36 does not change in the invention even when the car 38 is winched to its fully loaded position on the platform 26.

Thus, it may be seen that the simple relocation of the winch for platform 26 to the rear end thereof and the provision of the single sheave 34 at the front of the platform completely eliminates the dangerous difficulty resulting from an inadequate cable lead distance between the load and winch spool and the resulting excessive cable fleet angle. In addition to this benefit, a major obstruction is removed from the front of platform 26 which heretofore has impeded the truck driver's field of vision. Since only the small sheave 34 and not the large winch projects forwardly of the platform 26, the overall length of the truck is reduced without reducing its effective or usable length. The former problem of oil leakage from the winch splattering on the truck windshield is also avoided. Finally, the time of loading the carrier truck is somewhat reduced, because the rear mounted winch 33 is closer to the operator's control panel 41 near the rear end of the truck. As a result, the operator need not walk to the front of the truck to initially pull off the cable end for connection to the load. The benefits of the invention should now be clear to those skilled in the art.

For the rear tiltable bed or platform 22 behind the cab 21, the cable winch 27 that is normally located on the forward end thereof, as shown in FIG. 1, can be relocated to a medial portion of the platform 22, beneath the platform, in the same manner as illustrated in FIG. 3 with respect to the above-cab platform 26. Since the structural arrangement of a guide sheave at the front of the platform and a cable winch rearwardly thereof beneath the platform 22 are basically the same as shown at 34 and 33 for the platform 26 in FIG. 3, the arrangement for platform 22 has not been illustrated in the drawings. To obtain the advantage of the invention of even tracking or layering of the winch cable on the winch drum and thus elimination of damage to the winch cable and slippage due to cable pile-up, and provision of a constant cable lead distance between the forward guide sheave and the winch drum during all positions of loading of a vehicle onto the tiltable platform 22, the winch is spaced from the forward guide sheave or cable guide element a distance assuring a proper fleet angle for the cable relative to the winch. This distance will vary with the diameter of the winch cable being utilized but generally the distance will be in proportion to that illustrated in FIGS. 1, 3 and 4 with respect to platform 26.

FIGS. 9 and 10 show a modified form of the mounting for the single guide sheave 34 on the forward end of platform 26. In FIGS. 1-4, sheave 34 is rigidly mounted on the forward end of carrier tube 42 for rotation about a horizontal axis. Carrier tube 42 forms part of the reinforcing of the framing of platform 26. If the front end of a vehicle to be loaded onto the platform is so heavily damaged that the cable 37 must be attached off-center and more to one side of the undercarriage of the vehicle, the cable has a tendency to slip off the top of the sheave 34 as the vehicle is pulled up the platforms 22 and 26 since the cable 37 is off-center of the vertical plane of the sheave.

To overcome this problem, guide sheave 34, mounted for rotation about a horizontal axis in housing 43, is also mounted for swivel movement on the front of the platform 26 about an axis that is parallel with the longitudinal axis of the platform. Sheave housing 43 is connected on the forward end of hollow tube or shaft 44 which is socketed into the open front end of carrier tube 42, so that shaft 44 is free to swivel in tube 42. Thus, the cable 37 that is connected off-center to the vehicle being loaded swivels the top of the sheave 34 to the side from which the cable 37 is approaching the sheave, thereby aligning the sheave with the cable and preventing the off-center cable from slipping off the sheave. The bottom of the sheave is pivoted in the opposite direction but this does not effect the even layering of the winch cable on the winch drum because the cable lead distance remains unchanged and the fleet angle 40 is still small enough.

A plate 45 carrying a pair of stop surface elements 46 and 47 positioned at 90° from each other and respectively 45° on each side of the vertical plane through the sheave 34, is rigidly connected to the swivel shaft 44 at its connection with sheave housing 43. A keeper 48 connected to carrier tube 42 extends forwardly between stop surface elements 46 and 47 and beneath connecting surface 49 therebetween, and has its free end turned upwardly, as shown in FIG. 9, to engage the outer front surface of plate 45 to retain shaft 44 in tube 42. The stop surface elements 46 and 47 allow the sheave 34, its housing 43 and swivel shaft 44 to swivel 45° to either side off vertical before abutting keeper 48 which also functions as a stop element. It is to be understood that the positions of keeper 48 and plate 45 can be reversed without departing from the invention.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. In a car carrier of the type which includes an above-cab tiltable car support platform, a cable winch attached in underslung relation to the rearward end portion of such platform behind the cab, a cable guide sheave, means mounting said cable guide sheave for swivel movement to the forward end of the platform on an axis parallel with the longitudinal axis of the platform, a winch cable leading forwardly from the winch beneath the platform and around the sheave and then upwardly and rearwardly for attachment to a car being winched onto said platform, and said sheave and winch both movable with said tiltable support platform whereby the arrangement assuring the same attitude between said sheave and winch at all times and a constant cable lead distance at all times between the load and the winch and also assuring a proper cable fleet angle which is maintained constant.

2. In a car carrier as defined in claim 1, and said winch and said sheave being arranged substantially at the transverse center of said platform.

3. In a car carrier of the type having an above-cab tiltable storage platform for a single car, a rigid support frame connected above the cab for the tiltable storage platform, and having a transverse tilt axis between the tiltable storage platform and the support frame near cab roof level and closely behind the cab, the improvement which comprises power cylinder means connected between medial portions of the rigid support frame and tiltable storage platform in the area of the cab front windshield posts to raise and lower the tiltable storage platform, a cable winch on the rear end portion of the platform behind the cab, a cable guide element on the forward end of the platform, and a cable extending beneath said platform from said winch and over said cable guide element onto the top surface of said platform, whereby both the cable winch and cable guide element are movable with the tiltable platform and substantially the full length of the platform provides a constant fleet angle for the winch cable and a constant and adequate lead distance for the cable under all operating conditions of the platform.

4. In a car carrier as defined in claim 3, in which said cable guide element is a sheave rotatively connected to said platform.

5. In a car carrier as defined in claim 3, in which said cable winch is connected beneath said platform.

6. In a car carrier as defined in claim 5, including means swivelly mounting said cable guide element on said platform.

7. In a car carrier as defined in claim 3, in which said cable guide element is a guide sheave, and means mounting said guide sheave for swivel movement on said platform on an axis parallel with the longitudinal axis of said platform.

8. In a car carrier as defined in claim 7, including stop elements and a cooperating keeper, one of said stop elements and cooperating keeper carried by said means mounting said guide sheave for swivel movement and the other carried by said platform, said stop elements adapted to move into contact with said cooperating keeper to limit the swivel movement of said guide sheave.

* * * * *